US011579785B2

(12) United States Patent
Hupfeld et al.

(10) Patent No.: US 11,579,785 B2
(45) Date of Patent: Feb. 14, 2023

(54) SYSTEMS AND METHODS OF PROVIDING FAULT-TOLERANT FILE ACCESS

(71) Applicant: Quobyte Inc., Boston, MA (US)

(72) Inventors: Felix Hupfeld, Berlin (DE); Felix Langner, Berlin (DE); Robert Döbbelin, Berlin (DE)

(73) Assignee: Quobyte Inc., Boston, MA (US)

( * ) Notice: Subject to any disclaimer, the term of this patent is extended or adjusted under 35 U.S.C. 154(b) by 0 days.

(21) Appl. No.: 17/062,144

(22) Filed: Oct. 2, 2020

(65) Prior Publication Data

US 2022/0107730 A1    Apr. 7, 2022

(51) Int. Cl.
*G06F 3/06* (2006.01)
*G06F 11/07* (2006.01)

(52) U.S. Cl.
CPC .............. *G06F 3/064* (2013.01); *G06F 3/067* (2013.01); *G06F 3/0619* (2013.01); *G06F 3/0652* (2013.01); *G06F 3/0653* (2013.01); *G06F 3/0659* (2013.01); *G06F 11/0757* (2013.01)

(58) Field of Classification Search
CPC ...... G06F 3/064; G06F 3/0619; G06F 3/0652; G06F 3/0659; G06F 3/0653; G06F 11/0757; G06F 3/067
See application file for complete search history.

(56) References Cited

U.S. PATENT DOCUMENTS

| 2013/0238900 A1* | 9/2013 | Leggette ............. G06F 11/1451 713/165 |
| 2018/0225044 A1* | 8/2018 | Baptist .................. G06F 3/0619 |

* cited by examiner

*Primary Examiner* — Jason W Blust
(74) *Attorney, Agent, or Firm* — Choate, Hall & Stewart LLP; William R. Haulbrook; Peter A. Flynn

(57) ABSTRACT

Technologies are provided to ensure integrity of erasure coded data that is subject to read and write access from distributed processes. Multiple processes that access erasure coded data can be coordinated in an efficient, scalable and fault-tolerant manner so that integrity of the original data is maintained. The Technologies include a fault-tolerant access coordination protocol that ensures exclusive write access by a client. The coordination protocol achieves scalability by not relying on centralized components, and achieves efficiency and performance by piggy-packing access coordination messages on operations of the underlying erasure coding protocol.

19 Claims, 4 Drawing Sheets

SYSTEMS AND METHODS OF PROVIDING FAULT-TOLERANT FILE ACCESS

FIELD

This application generally relates to technologies for access to computer files.

BACKGROUND

In modern distributed computational data storage systems, the file system decouples application storage in files from the physical hardware, liberating it by using smart algorithms. The result is a software storage system that is self-managing, reliable and scalable. In order to maintain data safety, technologies preventing corruption of data and files due to, for example, failing storage devices must be implemented in the software managing the storage system.

SUMMARY

This specification describes technologies to ensure integrity of erasure coded data that is subject to read and write access from distributed processes. Multiple processes that access erasure coded data can be coordinated in an efficient, scalable and fault-tolerant manner so that integrity of the original data is maintained. Described herein is a fault-tolerant access coordination protocol that ensures exclusive write access by a client. The coordination protocol achieves scalability by not relying on centralized components, and achieves efficiency and performance by piggy-packing access coordination messages on operations of the underlying erasure coding protocol.

An example system is for providing fault-tolerant coordination of access to erasure coded data. The system includes a memory operable to store a file. The file includes a plurality of data blocks. The plurality of data blocks are allocated to a plurality of data groups. Each data group includes a subset of the plurality of data blocks and a coding block.

The system includes a server that includes a plurality of data storage devices. Each device stores a stripe. Each stripe includes a data block or a coding block from each of the plurality of data groups.

The system includes a processor of a client device coupled to the memory. The processor is operable to send, over a network, a request to the server comprising a file identifier associated with a stored file. The processor is operable to identify the stripes associated with the stored file. The processor is operable to send, over the network, a request for a plurality of stripe leases, each stripe lease associated with a stripe. The processor is operable to receive, from the server, the plurality of stripe leases and, if a majority of a total number of stripe leases are acquired and thereby a file lease is obtained, retrieve, from the server, each stripe of the stored file. The processor is operable to execute an operation on the file. The processor is operable to write, to each data storage devices, updated stripes. The processor is operable to release, upon completion of the writing, the plurality of stripe leases.

The operation may be or may include a read operation, a write operation, or an execute operation. The processor may be operable to hold one or more stripe leases until a timeout is reached and, if the majority of a total number of stripe leases has not been acquired at timeout, to release the acquired stripe leases. The processor may be operable to extend one or more stripe leases.

If one of the plurality of storage devices fails during operation, the processor may be operable to write one or more updated stripes to one or more alternative storage devices. If the file lease has been acquired, access to the file by a second client may be denied. If the file lease has been acquired, access to the file by the server may be denied.

The file may include at least one stripe consisting of data blocks and at least one stripe consisting of coding blocks. The file may include at least three stripes. The file may include M+N stripes, where M≥N. The operation may be terminated if a majority of M+N storage devices fail during operation.

An example method is for providing fault-tolerant coordination of access to erasure coded data. The method includes storing, in a memory, a file. The file includes a plurality of data blocks. The plurality of data blocks are allocated to a plurality of data groups. Each data group includes a subset of the plurality of data blocks and a coding block.

The method includes providing a server including a plurality of data storage devices. Each device stores a stripe. Each stripe includes a data block or a coding block from each of the plurality of data groups.

The method includes sending, by a processor of a client device coupled to the memory, over a network, a request to the server including a file identifier associated with a stored file. The method includes identifying the stripes associated with the stored file. The method includes sending, over the network, a request for a plurality of stripe leases, each stripe lease associated with a stripe. The method includes receiving, from the server, the plurality of stripe leases and, if a majority of a total number of stripe leases are acquired and thereby a file lease is obtained, retrieving, from the server, each stripe of the stored file. The method includes executing an operation on the file. The method includes writing, to each data storage devices, updated stripes. The method includes releasing, upon completion of the writing, the plurality of stripe leases.

The operation may be or may include a read operation, a write operation, or an execute operation. The method may include holding one or more stripe leases until a timeout is reached and, if the majority of a total number of stripe leases has not been acquired at timeout, releasing the acquired stripe leases. The method may include extending one or more stripe leases.

If one of the plurality of storage devices fails during operation, the method may include writing one or more updated stripes to one or more alternative storage devices. If the file lease has been acquired, access to the file by a second client may be denied. If the file lease has been acquired, access to the file by the server may be denied.

The file may include at least one stripe consisting of data blocks and at least one stripe consisting of coding blocks. The file may include at least three stripes. The file may include M+N stripes, where M≥N. The operation may be terminated if a majority of M+N storage devices fail during operation.

BRIEF DESCRIPTION OF THE DRAWINGS

The foregoing and other objects, aspects, features, and advantages of the present disclosure will become more apparent and better understood by referring to the following description taken in conjunction with the accompanying drawings.

Figure 1:
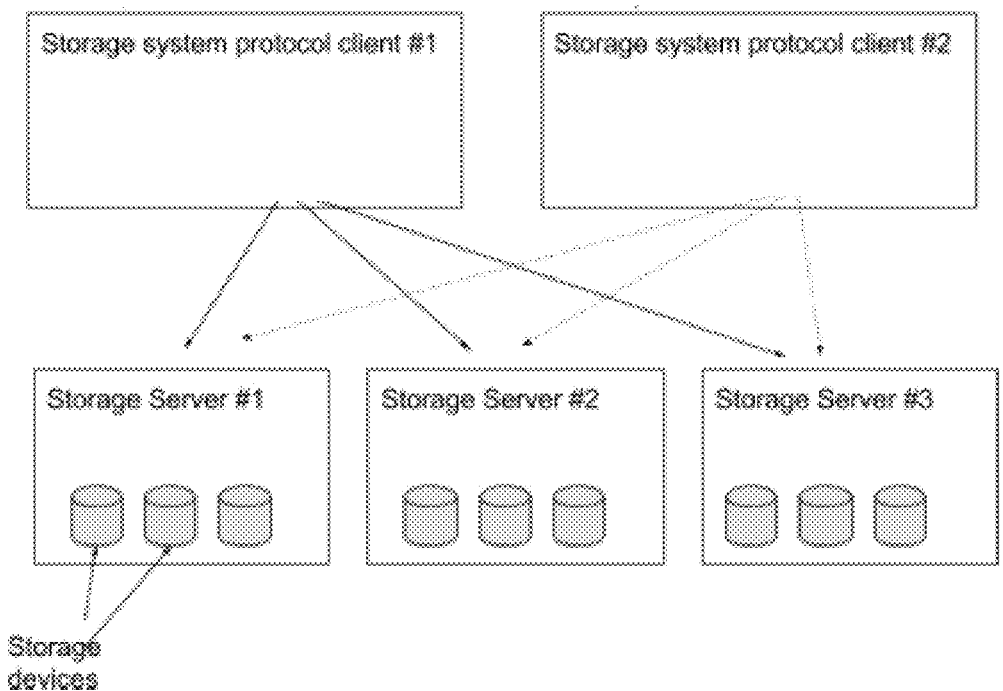
FIG. 1 is a block diagram of an example system for providing fault-tolerant file access.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In data storage, erasure coding (EC) refers a data redundancy technique to protect data against temporary unavailability or loss of storage devices. In erasure coding, data is broken into fragments. The data may be expanded and may be encoded with redundant data pieces. The data fragments may be distributed and stored across a set of different locations or storage media. Erasure coding mechanisms split file data into fragments and compute coding data for a specific subset of the file data. If a limited subset of the file data and coding data is lost or unavailable (a so called 'erasure'), the erasure coding algorithm can still compute the original data (file data or coding data) from the remaining file data and coding data and thereby improve availability and safety of the original data. Various single and multi-dimensional codes may have these capabilities. An example implementation of an erasure coding mechanism is RAID-6 (redundant array of independent disks), which uses disk drives connected to a single server to protect the data of individual disks (disk-level redundancy).

File data and coding data must be modified atomically so that the re-computation of data from remaining file data and coding data yields the original (file) data. In computer science, an operation carried out by a computer processor is considered atomic if the operation is guaranteed to be isolated from other operations that may be occurring at the same time, i.e., atomic operations are may be regarded as indivisible. If the atomicity were violated, the re-computation of a missing part would result in corrupted data (a corrupt data file). In RAID, this problem is known as the "RAID write hole" and mitigated in some systems by using battery-backed controllers or using more elaborate protocols to ensure atomicity (RAID-Z).

In order to be able to tolerate the loss of individual machines or their data storage devices (for example, storage disks), modern erasure coding systems distribute data across the disks of multiple machines. Therefore, there is a need to ensure atomic updates to data and coding data across machines through distributed algorithms.

Depending on, for example, the size of a data file, access patterns (for example, write-once, in-place updates, access concurrency), and the architecture of the distributed storage system the erasure coding mechanism is embedded in, different trade-offs can be made that result in specialized mechanisms to ensure consistency of file data and coding data.

Described herein are systems and methods for ensuring integrity of erasure coded data in context of a scalable, fault-tolerant, high-performance distributed file system. While the technologies described herein are not limited to use within a distributed file system, the technologies may be compatible with such distributed file systems and may therefore be scalable, fault-tolerant, and efficient.

As illustrated in FIG. 1, a distributed storage system may include of one or more servers that are connected by one or several computer networks, such as local or wide-area computer networks. Electronic data is stored on the servers on one or more storage devices, for example, one or more hard disks, solid state drives (SSD), or other non-volatile memory. Assignment of storage devices to servers may be fixed or variable, and may change over time. Data may be accessed by one or more clients, which may be or may include an active component of the storage system. A client may be or include a non-server component, and may be running on the same machine as the application. In some embodiments, a client may be co-located (i.e., running on the same machine, computer, server) with one or more data consuming applications, or may be co-located with one or more storage servers in order to manage data.

Figure 2:
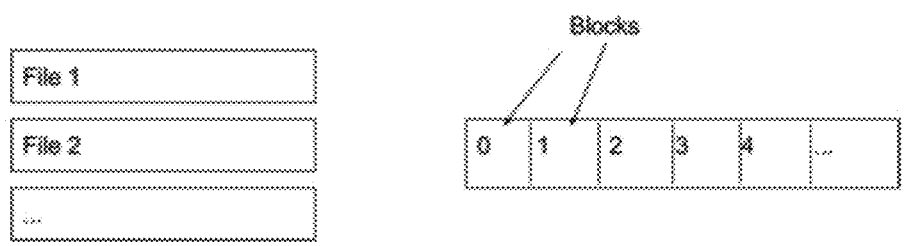
FIG. 2 is a block diagram of an example file structure in an example system for providing fault-tolerant file access.

Generally, a system as described herein manages (for example, stores, transfers, or manipulates) data in independent units called files. A file is sub-divided into fixed-size blocks (see FIG. 2). In computing terms, a block is generally regarded as a sequence of bytes or bits. A block may include a whole number of records that may determine a block size. Data structured accordingly may be regarded as blocked data. Generally, blocked data may be stored in a data buffer and read or written a whole block at a time. Typically, blocks have a size of between 512 bytes and 1 MB. In some embodiment, a block may have a size of 4 KB. Files may have any arbitrary length. For example, files may have any number of fixed-size blocks. The last block in a file may be smaller than the fixed block size. Files can be traditional files in a file system, or block devices of a block storage system.

Figure 3:
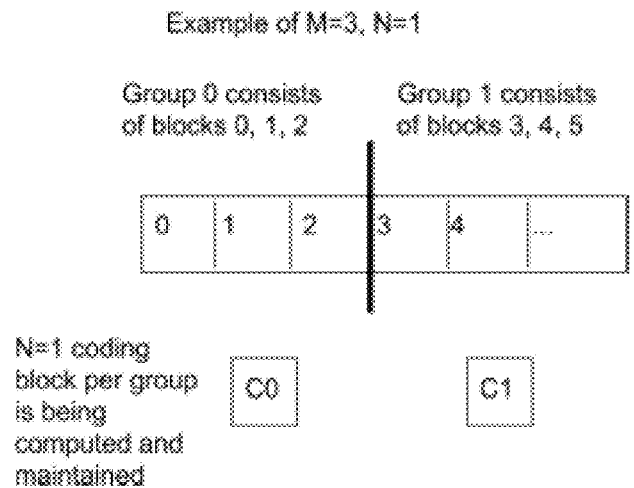
FIG. 3 is a block diagram of an example file structure in an example system for providing fault-tolerant file access.

Generally, a system as described herein manages (for example, stores, transfers, or manipulates) file data as groups of erasure coded data (data blocks) and coding data parts (coding blocks). For example, for a one dimensional erasure code, a group may be a series of M consecutive file data blocks (starting with block 0), for which N coding blocks are being computed. For example, with an M=3 and N=1 configuration, group 0 consists of data blocks 0, 1, and 2 that are accompanied by one coding block C0; group 1 consists of data blocks 3, 4, 5 that are accompanied by another coding block C1 (see FIG. 3). As coding blocks are computed for a file only from data blocks of the same file, the redundancy of an individual file is ensured independently from other files. Therefore, it is sufficient to describe the system's operation for a single file in the following description, even though the file system may store any number of files.

An erasure code allows re-computing the original M data blocks, if any N data or coding blocks have been lost. Because of this relationship, any change in data blocks necessitates re-computing the corresponding coding blocks. The new data blocks and coding blocks must always be stored atomically, i.e. either the previous state or the new state of a group is read, and never any intermediate states.

To protect the data, the M+N blocks of each group is stored in one of a set of disjunct M+N failure domains. A failure domain includes one of a set of multiple implements that may provide a service to a user and may operate independently of other failure domains that provide that same service. In some embodiments, each group is stored in disjunct example, on distinct devices, servers, or even geographic locations). In order to simplify placement of data and consolidate metadata, K consecutive groups of data and coding data may be co-located to the same set of failure domains. This set of groups is called a segment. A set of blocks stored on the same failure domain (for example, on the same storage device) is called a stripe (see FIG. 4). Stripes consisting of data blocks may be referred to as data stripe, and stripes consisting of coding blocks may be referred to as coding stripes.

Figure 5:
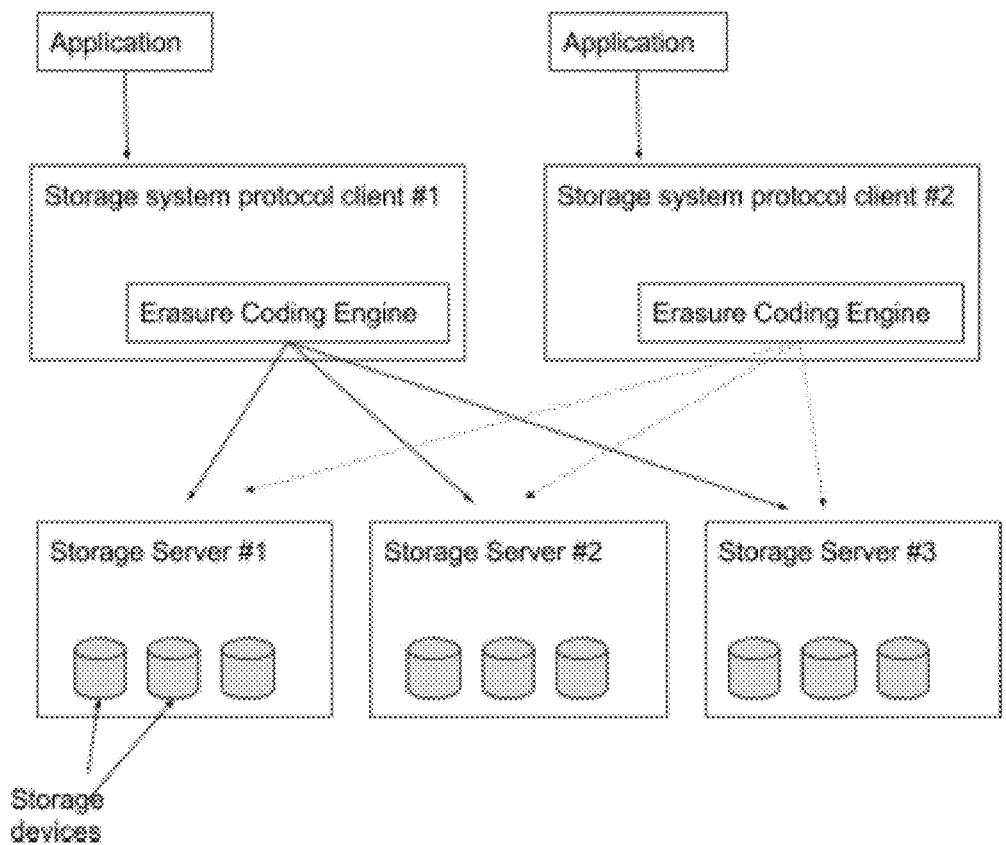
FIG. 5 is a block diagram of an example system for providing fault-tolerant file access.

Depending on the sought level of fault tolerance, storage devices that store stripes of a file may be attached to the same servers. In some embodiments, stripes of the same file must be stored on storage devices of separate servers. Typically, stripes are stored on storage devices in physical files on a local file system, on block devices, in databases, or in custom personal data structures. Each block may be stored in physical files on a local file system. In other embodiments, blocks can be stored in custom persistent data structures, on block devices, or in databases Groups of data and associated coding data are kept consistent by the system's erasure coding engine. The erasure coding engine may be part of a client and may facilitate any read or write access to data that are usually initiated by an application working with the data (See FIG. 5).

The erasure coding engine of a client uses a commit protocol that is configured to or capable of ensuring the atomicity of changes to a group of data blocks along with computed coding blocks. A commit protocol may be or may include an algorithm that ensures that all sites in a distributed system either commit or abort a transaction unanimously, even in the presence of a failure. Each block is accompanied by metadata that is used by the commit protocol for ensuring atomicity.

The erasure coding engine communicates with one or more storage servers (for example, across a network) to read or write (or both read and write) blocks along with their metadata. The storage servers read or write said data to their local storage devices.

Described herein are systems and methods for coordination of access to erasure coded data. The system and methods include one or more of three protocols: A data protocol, a commit protocol, and a coordination protocol. The data protocol may be used for operations of reading and writing application data to storage servers. These operations are initiated by an application and performed by an erasure coding engine as remote read block and write block operations on the storage devices. The commit protocol may be used to ensure that file data and coding data are consistent. The commit protocol assumes exclusive access to the file data, which is provided by a coordination protocol. An example of a commit protocol with this property is two-phase commit A two-phase commit protocol (2PC) is a distributed algorithm that coordinates all processes that participate in a distributed atomic data transaction. This protocol may coordinate processes to commit or abort (roll back) the transaction, and may thus be regarded as a specialized type of consensus protocol. The commit protocol may be used successfully even in case of temporary system failure. The coordination protocol may be used to ensure exclusive access to data, and to coordinate any access by one or more erasure coding engines distributed across two or more machines. This coordination protocol is described further herein. While these are different protocols, messages of the three protocols usually co-occur and may be combined into one physical message in order to save message round trips and gain efficiency.

The goal of the coordination protocol is to coordinate time-limited exclusive access to file parts on one or more storage servers in the form of a so-called file lease. Generally, a lease may be viewed as a contract that gives a lease holder a set of predetermined rights to a (file) resource for a limited period time (unlike a lock, which has no timeout). A file lease is acquired by a client's erasure coding engine by acquiring the majority of individual stripe leases from storage servers. The file lease is released by releasing all held individual stripe leases associated with the storage servers. Hence, the file lease consists of the stripe leases (for example, one stripe lease per storage server), and is only known to the client's erasure coding engine. Because the file lease expires when not renewed, it is automatically withdrawn from the lease owner in case of any failure.

Figure 4:
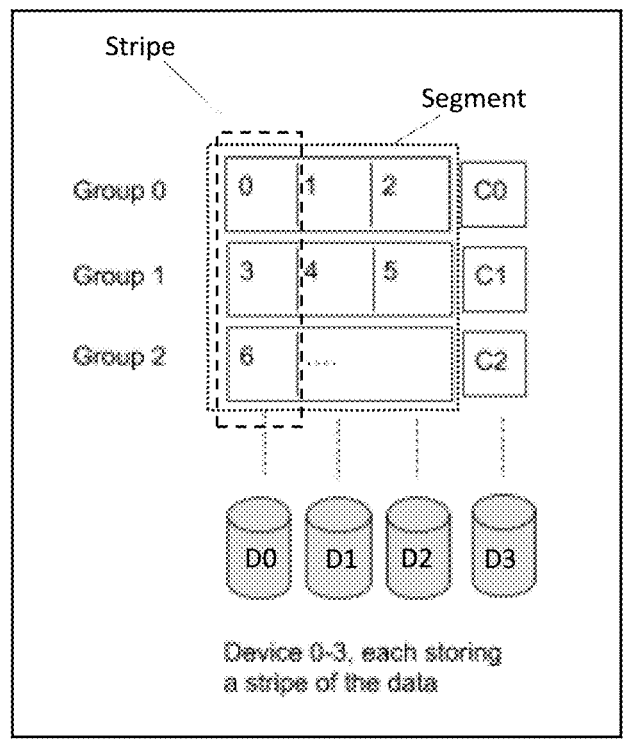
FIG. 4 is a block diagram of an example storage server of an example system for providing fault-tolerant file access.

In an example implementation, consider a system including a storage server with four storage devices D0-D3, for example, as shown in FIG. 4. Each storage device stores one stripe that is part of a file. If a client attempts to acquire the file lease, the client attempts to acquire a majority of the stripe leases, in this case, at least three stripe leases. Once the majority of stripe leases has been acquired, the client holds the file lease and may perform one or more operations on the file. For example, the client may read, write, execute, or otherwise manipulate the file. In some embodiments, a client may re-create redundancy in the system, for example, in case of failure of one or more storage devices (for example, devices D0-D3). In some embodiments, the storage server is configured as a 2+2 system, i.e., a system where up to two of four storage device can fail and where the original file can be restored from the two working devices. In some embodiments, the storage server is configured as a 3+1 system, i.e., a system where one of four storage device can fail and where the original file can be restored from the three working devices. In some embodiments, the storage server is configured as a 8+3 system, i.e., a system where up to three of eleven storage device can fail and where the original file can be restored from the eight working devices. A client holding a valid file lease may re-create redundancy by (re)distributing stripes across new storage devices, for example, in lieu of the failed devices.

In some embodiments, the coordination protocol can be extended to also coordinate shared access (instead of just exclusive access) for coordinating concurrently read accesses with write accesses.

The coordination protocol guarantees fault-tolerant exclusive access. This fault tolerant exclusive access serves at least two purposes for the commit protocol and the data protocol. First, the fault tolerant exclusive access may prevent any concurrent modifications of data on storage servers by more than one client erasure coding engine (mutual exclusion). Second, the fault tolerant exclusive access may enable the implementation of the commit protocol with an efficient two-phase commit protocol (consistency of data and coding blocks).

The coordination protocol may be configured for scalability of the system, which may be achieved by elimination of any central or core component that may limit processing capacity. The coordination protocol may be configured for fault-tolerance. For example, the coordination protocol may tolerate loss of one or more clients (for example, failure of a lock owner device, expiration of lock) or may tolerate loss of a (limited) number of storage servers. The coordination protocol may be configured for efficiency and performance. For example, the protocol may avoid extra messages, may minimize locking delay, or may limit amount of messages sent. The coordination protocol may be configured for fairness and starvation prevention, which may include a prevention of one or more processes that are perpetually denied necessary resources to process their respective work.

In some embodiment, a coordination protocol may include two components: an upper file layer and a lower file layer. An (upper) file layer is part of the erasure coding engine in a client and is responsible for ensuring exclusive access to a file. It is used by all file access operations to either gain or maintain exclusive access to a file. The (lower) file layer is a per-server lease management mechanism for leases on a file.

Lease

Generally, a lease includes a time-limited entitlement to a resource. A lease may include a lease owner (the identifier of the client and its erasure coding engine). A lease may include an expiration time. A lease may include a renew time (a time period before expiration time during which the lease may be renewed). In some embodiments, a lease includes a lease owner, an expiration time, and a renew time.

Conceptually, a lease may be considered valid any time prior to a process reaching the expiration time. In some embodiments, safety margins may be applied to compensate for loosely synchronized clocks. A clock synchronization mechanism may be assumed that keeps clocks synchronized across machines within a certain margin.

Operations on a lease include acquiring, by a client, a lease (become lease owner if there is no other lease owner). Operations on a lease include releasing, by a client, lease (relinquish ownership of a lease). Operations on a lease include extending, by a client, a lease (extend lease expiration time by the lease owner).

Volatile State in the Storage Server

In some embodiments, each storage server maintains a record of lease state for a file along with a queue of acquired lease requests. For each file, a storage server may maintain a record of each current stripe lease (if any). For each file, a storage server may maintain a record of a queue of outstanding acquire stripe lease requests.

Storage Server Operations

An erasure coding engine in a client device may make use of the following coordination protocol messages in a data server to acquire and release individual stripe leases. Each client is identified by a unique client identifier. The client may send the following operations on a storage server:
ACQUIRE_STRIPE_LEASE (client identifier, file);
RELEASE_STRIPE_LEASE (client identifier, file);
EXTEND_STRIPE_LEASE (client identifier, file).

In addition, a storage server-internal operation may be included, for example, STRIPE_LEASE_GUARD (client identifier, file).

Operation ACQUIRE_STRIPE_LEASE, by a client A, includes a (first) request to acquire a stripe lease. The operation checks if there is a valid lease of a file stripe (stripe lease) held by a different client, B. If not, a new lease is assigned to the client A. If there is a valid stripe lease held by client B, the request is enqueued in the "acquire queue."

Operation RELEASE_STRIPE_LEASE, by a client A, releases a current stripe lease. If the queue is not empty (contains at least one request) and the stripe lease is already invalid, a (first) request is de-queued and a new stripe lease is assigned in response. Releasing a stripe lease for which an acquire request is queued may result in the request to acquire being cancelled immediately as the lease is no longer needed and thus the request becomes redundant.

Operation EXTEND_STRIPE_LEASE, by a client, checks if the source of this operation is the current stripe lease owner. If the requester is the current lease owner, the expiration time of the stripe lease may be extended, for example, by a constant of fixed amount of time. If the requester is not the current stripe lease owner, an error is returned to the (requester) client, which prevents the (requester) client and its applications from further modifying the file until the (requester) client successfully re-acquired the stripe lease (and thus the file lease).

The STRIPE LEASE GUARD is an internal operation that is invoked in the storage server. This operation may be invoked before every operation by the data protocol and consistency protocol to assure that the issuing client holds a valid file lease and thereby has exclusive access (lock fencing).

For efficiency, (stripe) lease-related operations can be combined with operations of the commit protocol and data protocol and do not require extra message exchanges. The stripe lease operations may then also function as a guard: Only if the lease part of the operation succeeds, any other part of the operation may be executed.

Volatile State in the Client

For each file subject to an operation as described herein, the client maintains a list of M+N stripe leases, where M is the number of data blocks and N is the number of coding blocks. For each file subject to an operation as described herein, the client maintains a computed file lease, which is derived from individual stripe leases. A client is considered the exclusive owner of the file if the client holds the file lease. A file lease is said to be held by a client if a client is the holder of the majority of stripe leases and the stripe leases are valid.

Client Operations

An erasure coding engine in a client device may make use of the following coordination protocol messages in a data server to acquire and release one or more file leases. Each client is identified by a unique client identifier. The client may send the following operations on a storage server:
ACQUIRE_FILE_LEASE;
EXTEND_FILE_LEASE; and
RELEASE_FILE_LEASE.

In some embodiments, the (file) lease acquisition and (file) lease release time points may be further refined by releasing the (file) lease when a file has not been written for a predetermined period of time (for example, after 30 seconds of inactivity), and re-acquiring the (file) lease on the first write operation if there is no lease held by another client.

Operation ACQUIRE_FILE_LEASE is invoked when a file is opened. The operation ACQUIRE_FILE_LEASE includes sending an ACQUIRE_STRIPE_LEASE message to all stripes (that is, sending this message to storage servers that store data blocks or coding blocks of the file). The operation ACQUIRE_FILE_LEASE includes while ACQUISITION_TIMEOUT (as described below) has not passed: waiting until a majority of storage servers that store data blocks or coding blocks of the file has responded. If a majority has responded with success and a majority of stripe leases is acquired, a file lease is held. Otherwise, if a majority of stripe leases is not acquired, a RELEASE_STRIPE_LEASE message is sent to stripes (that is, to storage servers that store data blocks or coding blocks of the file) and a new attempt to acquire a file lease may be started.

Operation EXTEND_FILE_LEASE may be invoked periodically as necessary. The operation EXTEND_FILE_LEASE includes sending an EXTEND_STRIPE_LEASE to all stripes (that is, sending this message to storage servers that store data blocks or coding blocks of the file). The operation EXTEND_FILE_LEASE includes waiting until majority of storage servers that store data blocks or coding blocks of the file has responded. If no responses or errors have been received from a majority, release all stripe leases via RELEASE_FILE_LEASE to all (without waiting). If a majority has responded with success, a file lease is extended. Otherwise, if a majority has not responded with success, a RELEASE_STRIPE_LEASE is sent to all storage servers (without waiting for a response) and a new attempt to acquire a file lease may be started.

Operation RELEASE_FILE_LEASE is invoked when a file is closed. The operation RELEASE_FILE_LEASE includes sending RELEASE_STRIPE_LEASE to all stripes (that is, sending this message to storage servers that store data blocks or coding blocks of the file).

Compute Lease Acquisition Lease Timeout

When multiple clients try to acquire a file lease, they compete for the acquisition of one or more stripe leases. A client that has obtained an individual stripe lease will hold on to it and wait for more stripe leases to be acquired. If a predetermined HOLD_LEASE timeout has passed for the client without a majority of stripe leases having been acquired, any leases obtained to date are released to enable a competing client to obtain exclusive access to the file.

The HOLD_LEASE timeout must be short enough so that a losing client does not block a winning client for too long, but long enough so that the winning client will not give up before acquiring any missing stripe leases that have been released by another client. Additionally, stalemate situations need to be resolvable without having the competitors getting caught in a live-lock of alternating between returning and reacquiring leases. To that end, the acquisition timeout that a client that already holds a set $C=\{i|i\in[0,M+N-1]\}$ of stripe leases (out of the M+N stripe leases) uses to wait until an outstanding ACQUIRE_STRIPE_LEASE request is successful (or consider it failed otherwise) may be defined as:

$$\text{ACQUISITION\_TIMEOUT}\ (C) = |C|*H_{const} + (\Sigma s(i)\ \text{for}\ i \in C/S)*(H_{const}*2)$$

Given M+N stripes $b_i$ with i in [0, M+N−1], the following definitions apply:
$s(i)=2^i$: score of a lease for $b_i$—this guarantees that no two score sums are equal;
$S=\Sigma s(i)$ for i in [0, M+N−1]: the sum of scores of all stripes, i.e. the highest possible score;
C: the set of stripe numbers for which the client holds leases;
|C|: the number of stripes leases held by the client (cardinality of C);
$H_{const}$: a constant proportional to protocol message round trip time.

The first summand ensures that clients with the most stripe leases acquired will hold on for the longest time before giving up. The expression of the second summand is scaled between 0 and $H_{const}$, depending on the score for all leases acquired so far. By scaling $H_{const}$ with 2 on the second summand's last factor, it is ensured that the highest scored stripe will have a ACQUISITION_TIMEOUT close to two-times the lowest scored stripes. In return this will grant maximum leverage on stripe scoring without violating the property that the client with the most stripes will wait the longest.

EXAMPLE EMBODIMENTS

In some embodiments, storage servers can be virtual servers that are replicated across physical nodes. This replication encompasses any file data and internal data of the coordination protocol and the commit protocol. Using replicated virtual servers instead of physical servers provides for transparent migration of file data between machines.

In some embodiments, the lease coordination protocol can be used to coordinate file system locks between file data that is striped across storage servers (but not erasure coded). A file system lock includes shared and exclusive application access to file data.

In some embodiments, apart from coordinating exclusive access to ensure consistency of erasure coded data, the exclusive access to a file that is provided by the mechanisms described herein may also be used to implement other operations on a file that require exclusive access to work correctly. For example, in case of a permanent device failure, the placement of a file's stripes has to be adjusted to prevent the failed device from assigning the stripe to a new device and from regenerating the stripe data in the new device. In order to avoid concurrent, inconsistent changes, the placement change and its execution must be performed by a single client in the system. Using the described lease mechanism, a client can acquire the file lease, and then safely proceed to change the placement and regenerate stripe data.

Described herein are systems and methods that may be used to ensure exclusive access to an erasure coded file whose data stripes and coding stripes are stored across distributed storage services. The exclusive access is achieved using a two-phase commit protocol to ensure consistency between groups of file data and associated coding data.

The coordination protocol is fault-tolerant as it can operate correctly only as long as a majority of storage servers relevant for a given file are operational. With this property, the commit protocol can tolerate more failures than the erasure code itself, as long as M>N for a M+N erasure code configurations, which is usually the case. The coordination protocol is efficient as it does not rely on extra messages, but can be piggy-packed on protocol messages that operate on data and coordinate consistency. It is scalable because it does not rely on a central entity but runs entirely distributed between one or more specific client servers and one or more specific storage servers of a file.

Figure 6:
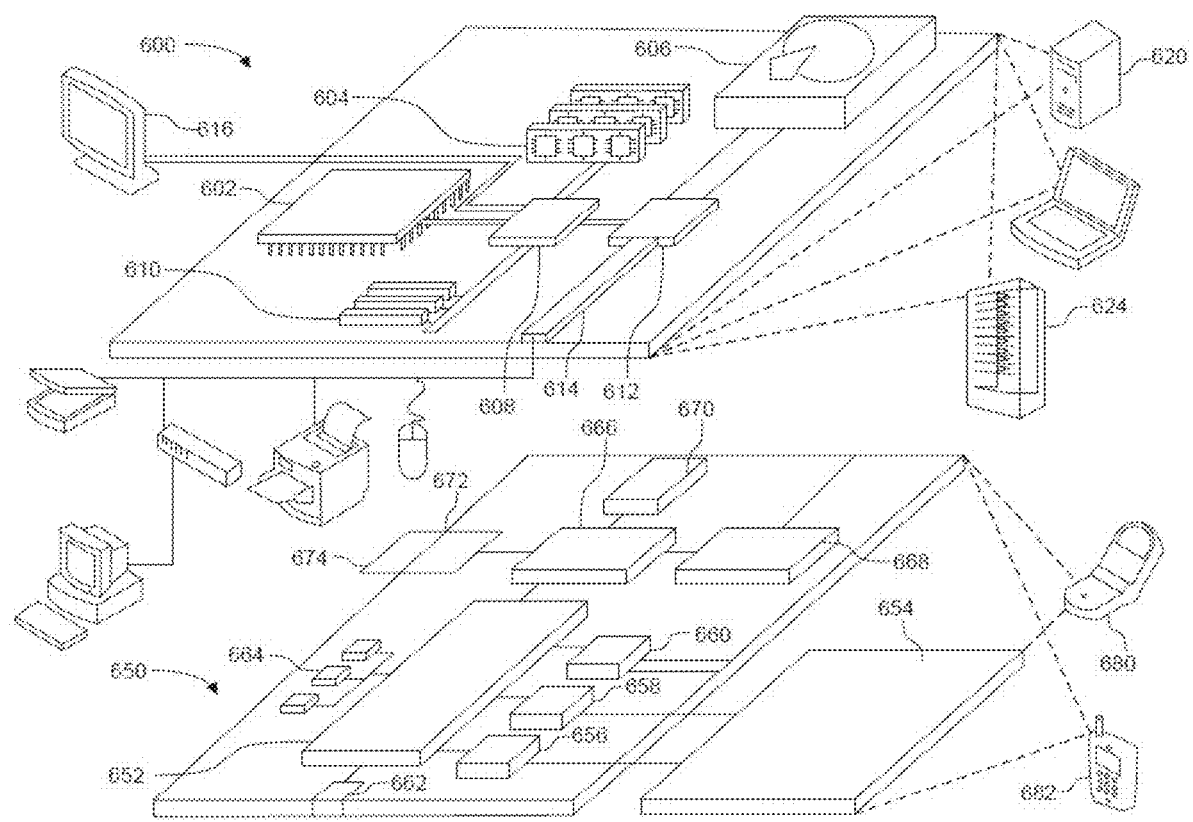
FIG. 6 shows an exemplary computing device and mobile computing device.

FIG. 6 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 may include a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or various solid state memory device, or an array of devices, including devices in a storage area network or various configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementations, the low-speed interface 612 is coupled to the storage device 606 and the low-speed expansion port 614. The low-speed expansion port 614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 may include a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth®, Wi-Fi™, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that may include a back end component (e.g., as a data server), or that may include a middleware component (e.g., an application server), or that may include a front end component (e.g., a client computer having a graphical user interface or a Web browser through which a user can interact with an implementations of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a system and method for injecting state and routing information into a communication exchange between a platform server and an end-point device over a stateless persistent connection are provided. Having described certain implementations of methods and apparatus for supporting injection of the state and routing information into the communication exchange, it will now become apparent to one of skill in the art that other implementations incorporating the concepts of the disclosure may be used.

Moreover, in view of the structure, functions and apparatus of the systems and methods described here, in some implementations, a system and method for communication over a set of persistent connections between two network nodes and an intermediary node are provided. Having described certain implementations of methods and apparatus for supporting communication over the persistent connection, it will now become apparent to one of skill in the art that other implementations incorporating the concepts of the disclosure may be used.

Moreover, in view of the structure, functions and apparatus of the systems and methods described here, in some implementations, a system and method for communication over a set of persistent connections between two network nodes and an intermediary node are provided. Having described certain implementations of methods and apparatus for supporting communication over the persistent connection, it will now become apparent to one of skill in the art that other implementations incorporating the concepts of the disclosure may be used.

Therefore, the disclosure should not be limited to certain implementations, but rather should be limited only by the spirit and scope of the following claims.

What is claimed:

1. A system for providing fault-tolerant coordination of access to erasure coded data, comprising:
   a memory operable to store a file, the file comprising a plurality of data blocks, the plurality of data blocks allocated to a plurality of data groups, each data group comprising a subset of the plurality of data blocks and a coding block;

a server comprising a plurality of data storage devices; each device storing a stripe, each stripe comprising a data block or a coding block from each of the plurality of data groups;

a processor of a client device coupled to the memory, the processor being operable to:
send, over a network, a request to the server comprising a file identifier associated with a stored file,
identify the stripes associated with the stored file;
send, over the network, a request for a plurality of stripe leases, each stripe lease associated with a stripe, each stripe lease comprising an associated score;
receive, from the server, the plurality of stripe leases and, if a majority of a total number of stripe leases are acquired and thereby a file lease is obtained, retrieve, from the server, each stripe of the stored file;
execute an operation on the file;
write, to each data storage devices, updated stripes; and
release, upon completion of the writing, the plurality of stripe leases;
wherein the processor is operable to hold the plurality of stripe leases until a timeout is reached and, if the majority of a total number of stripe leases has not been acquired at timeout, to release the acquired stripe leases,
wherein the timeout is computed as the sum of a first summand and a second summand,
wherein the first summand ensures that clients with the most stripe leases acquired will hold on for the longest time before giving up, and
wherein the second summand is scaled between 0 and a constant value proportional to a protocol message round trip time depending on the score for all leases acquired so far by the client.

2. The system of claim 1, wherein the operation is or comprises a read operation, a write operation, or an execute operation.

3. The system of claim 1, wherein the processor is operable to extend one or more stripe leases.

4. The system of claim 1, wherein, if one of the plurality of storage devices fails during operation, the processor is operable to write one or more updated stripes to one or more alternative storage devices.

5. The system of claim 1, wherein, if the file lease has been acquired, access to the file by a second client is denied.

6. The system of claim 1, wherein, if the file lease has been acquired, access to the file by the server is denied.

7. The system of claim 1, wherein the file comprises at least one stripe consisting of data blocks and at least one stripe consisting of coding blocks.

8. The system of claim 1, wherein the file comprises at least three stripes, and
where up to 25% to 50% of the plurality of data storage devices can fail and the file is restored from the working devices of the plurality of data storage devices.

9. The system of claim 1, wherein the file comprises M+N stripes, wherein M≥N, and wherein the operation is terminated if a majority of M+N storage devices fail during operation.

10. A method for providing fault-tolerant coordination of access to erasure coded data, comprising the steps of:
storing, in a memory, a file, the file comprising a plurality of data blocks, the plurality of data blocks allocated to a plurality of data groups, each data group comprising a subset of the plurality of data blocks and a coding block;
providing a server comprising a plurality of data storage devices; each device storing a stripe, each stripe comprising a data block or a coding block from each of the plurality of data groups;
sending, by a processor of a client device coupled to the memory, over a network, a request to the server comprising a file identifier associated with a stored file,
identifying the stripes associated with the stored file;
sending, over the network, a request for a plurality of stripe leases, each stripe lease associated with a stripe, each stripe lease having an associated score;
receiving, from the server, the plurality of stripe leases and, if a majority of a total number of stripe leases are acquired and thereby a file lease is obtained, retrieving, from the server, each stripe of the stored file;
executing an operation on the file;
writing, to each data storage devices, updated stripes;
releasing, upon completion of the writing, the plurality of stripe leases; and
holding the plurality of stripe leases until a timeout is reached and, if the majority of a total number of stripe leases has not been acquired at timeout, releasing the acquired stripe leases,
wherein the timeout is computed as the sum of a first summand and a second summand,
wherein the first summand comprises the product of (1) the number of stripe leases held by the client, and (2) a first constant, the first constant being proportional to the protocol message round trip time, and
wherein the second summand comprises the product of (1) the sum of scores of all stripe leases held by the client, and (2) two times the first constant.

11. The method of claim 10, wherein the server comprises multiple storage servers,
wherein the plurality of stripe leases are striped across the multiple storage servers, and
wherein the operation is or comprises a read operation, a write operation, or an execute operation, the method further comprising:
coordinating the plurality of stripe leases between file data that is striped across the multiple storage servers.

12. The method of claim 10, comprising extending one or more stripe leases, wherein the timeout includes a maximum limit such that a losing client does not block a winning client for longer than a predetermined period of time, and wherein the timeout includes a minimum limit such that the winning client will not give up before acquiring any missing stripe leases that have been released by another client.

13. The method of claim 10, wherein, if the file lease has been acquired, access to the file by a second client is denied.

14. The method of claim 10, wherein, if the file lease has been acquired, access to the file by the server is denied.

15. The method of claim 10, wherein the file comprises at least one stripe consisting of data blocks and at least one stripe consisting of coding blocks, and
wherein the plurality of data groups is striped across multiple storage servers.

16. The method of claim 10, wherein the file comprises at least three stripes, and
wherein the plurality of data groups is distributed across disks of multiple machines.

17. The method of claim 10, wherein the file comprises M+N stripes, wherein M≥N, and wherein the operation is terminated if a majority of M+N storage devices fail during operation.

18. A method for providing fault-tolerant coordination of access to erasure coded data, comprising the steps of:
   storing, in a memory, a file, the file comprising a plurality of data blocks, the plurality of data blocks allocated to a plurality of data groups, each data group comprising a subset of the plurality of data blocks and a coding block;
   providing a server comprising a plurality of data storage devices; each device storing a stripe, each stripe comprising a data block or a coding block from each of the plurality of data groups;
   sending, by a processor of a client device coupled to the memory, over a network, a request to the server comprising a file identifier associated with a stored file,
   identifying the stripes associated with the stored file;
   sending, over the network, a request for a plurality of stripe leases, each stripe lease associated with a stripe,
   receiving, from the server, the plurality of stripe leases and, if a majority of a total number of stripe leases are acquired and thereby a file lease is obtained, retrieving, from the server, each stripe of the stored file;
   executing an operation on the file;
   writing, to each data storage devices, updated stripes; and
   releasing, upon completion of the writing, the plurality of stripe leases, wherein when multiple clients try to acquire a file lease, they compete for the acquisition of the plurality of stripe leases;
   wherein a client that has obtained an individual stripe lease will hold on to it and wait for more stripe leases to be acquired; and
   wherein if a predetermined timeout has passed without a majority of stripe leases having been acquired, any leases obtained to date are released to enable a competing client to obtain exclusive access to the file; and
   wherein, for a given client, the predetermined timeout is directly proportional to the number of stripe leases held by the given client such the predetermined timeout is longer for clients that hold more stripe leases than the predetermined timeout for clients that hold less stripe leases.

19. The method of claim 18, wherein the timeout includes a maximum limit such that a losing client does not block a winning client for longer than the predetermined timeout, and
   wherein the predetermined timeout includes a minimum limit such that the winning client will not give up before acquiring any missing stripe leases that have been released by another client.

* * * * *